United States Patent [19]

Platt et al.

[11] Patent Number: 5,389,425
[45] Date of Patent: Feb. 14, 1995

[54] PACKAGING MATERIALS

[75] Inventors: David N. Platt, Bridgwater; Andrew Holloway, Witney, both of England

[73] Assignee: Courtaulds Packaging Limited, Essex, United Kingdom

[21] Appl. No.: 777,317

[22] PCT Filed: May 1, 1991

[86] PCT No.: PCT/GB91/00700

§ 371 Date: Dec. 3, 1991

§ 102(e) Date: Dec. 3, 1991

[87] PCT Pub. No.: WO91/17202

PCT Pub. Date: Nov. 14, 1991

[30] Foreign Application Priority Data

May 1, 1990 [GB] United Kingdom ................ 9009783

[51] Int. Cl.$^6$ ..................... B32B 27/14; B32B 27/08; C11D 17/00
[52] U.S. Cl. .................................... 428/195; 428/507; 428/515; 428/913; 428/35.2; 252/90
[58] Field of Search ............... 428/905, 195, 507, 515, 428/913; 252/90

[56] References Cited

U.S. PATENT DOCUMENTS 3,623,659 11/1971 Malerson ............................. 428/905
3,762,454 10/1973 Wilkins, Jr. .
4,348,293 9/1982 Clarke et al. .
4,797,211 1/1989 Gueldenzopf .

FOREIGN PATENT DOCUMENTS 0011502 5/1980 European Pat. Off. .
0079712 5/1983 European Pat. Off. ..... C11D 17/04
0217186 4/1987 European Pat. Off. .
2083762 3/1982 United Kingdom ........... B32B 7/02
2109706 6/1983 United Kingdom ........... B32B 5/28

Primary Examiner—George F. Lesmes
Assistant Examiner—Kathryne E. Shelborne
Attorney, Agent, or Firm—Bacon & Thomas

[57] ABSTRACT

A water soluble, or water dispersible, polymeric film comprising a layer of a first polymer resistant to dissolution and/or softening on handling with wet hands, and a layer of a second polymer resistant to insolubilization in water by perborate ions. Such films have a variety of uses particularly when they have a layer of an at least cold water soluble polymer between the layers of the said first and second polymers, for example in the packaging log washing products or agrochemicals. The first polymer layer is preferably discontinuous so that in the large body of water the film has reduced strength so that water can pass through the film when the film is agitated in the water.

7 Claims, No Drawings

PACKAGING MATERIALS

This invention concerns water soluble or water dispersible packaging materials.

Water soluble and water dispersible packaging materials have been proposed hitherto, in particular for packaging materials which are themselves to be dissolved and/or dispersed in water. Thus it has been proposed to package soaps or detergents in water soluble polymeric films, for example polyvinyl alcohol films, or in paper containers bonded by a water soluble adhesive. Hitherto proposed polyvinyl alcohol films often have the disadvantage that they start to dissolve when handled with wet hands. Furthermore, substances present in the packaged materials can inhibit dissolution of the polyvinyl alcohol and therefore defeat the object of having a soluble film. Thus borate ion-containing materials tend to cause gelling of polyvinyl alcohol which inhibits its dissolution. It has been proposed in European Patent Specification 79712, for example, to incorporate certain polyols such as sorbitol in the polyvinyl alcohol to reduce this undesirable gelling effect, but it doesn't address the problem of softening and/or partial dissolution on handling. Dispersible paper containers suffer from the disadvantage that the paper itself remains and has to be physically removed for example from a load of washing in a washing machine. Such paper containers have proved to be unacceptable to consumers.

An alternative approach to these problems described in GB 2109706A is to make containers for such products from a base film of an at least partially water-soluble plastics material carrying on one surface a protective layer of particles of polytetrafluoroethylene, the layer of particles preventing the packaged product from contacting the water-soluble plastics material, for example of polyvinyl alcohol. Such containers are complicated to produce as areas of the film where heat seals are to be formed should not have a layer of polytetrafluoroethylene thereon.

According to the present invention there is provided a water soluble or water dispersible polymeric film comprising a layer of a first polymer resistant to dissolution and/or softening on handling with wet hands, and a layer of a second polymer resistant to insolubilization in water by perborate ions.

Although films of the present invention can consist of the two specified layers, it is generally preferred to incorporate a layer of an at least cold water soluble polymer between the said first and second layers. This has a number of advantages, for example the choice of materials for the first and second layers is generally wider when such a third layer is present, and these third layers also often serve to impart improved mechanical properties to the films.

The first polymer layer should be of a polymeric material which imparts to the film resistance to dissolution and/or softening on handling the film with wet hands. Preferred polymeric materials for the purpose include nitrocellulose, polyvinylidene chloride and polyvinyl alcohol having low solubility at ambient temperature, when the polymeric materials such as nitrocellulose or polyvinylidene chloride are used, they preferably form an incoherent layer so that when it is intended to cause dissolution or dispersion of the film in water, the water can reach the layer or layers underneath. Such layers can be produced by known methods, for example gravure printing.

Layers of polyvinyl alcohol used for the first layer should have only low solubility at ambient temperature. The precise temperature at which solubility occurs is generally not critical. However, it is generally preferred that the polymer layer doesn't feel sticky on normal handling, for example when a container of a washing powder produced from a film of the present invention is placed in a washing machine using wet hands. It is generally preferred that this should be so for a period of about two minutes. The polyvinyl alcohol should, however, be sufficiently soluble that the film will dissolve and/or disperse at a desired elevated temperature at which the contents of a container made of a film of the invention should be released from the container. The polyvinyl alcohol used for the first layer is preferably a hydrolysed polyvinyl acetate having a degree of hydrolysis of from 80 to 99 percent, and especially from 90 to 99 percent.

The third layer, when present, is conveniently made of a cold water soluble polymer, the first polymer layer serving to protect this layer from dissolution for example when the film is handled. Examples of polymers which can be used include polyvinyl alcohol, methyl cellulose, poly-(ethylene oxide) and poly-(ethyloxazalene), polyvinyl alcohol generally being preferred. Particularly preferred polyvinyl alcohols are polyvinyl acetates having a degree of hydrolysis of from 70 to 99 percent, and especially from 75 to 80 percent.

The layer of the first polymer will usually contain substances which impart other properties to the films, for example antiblock agents (e.g. silica with an average particle size up to 20 microns), surfactants, processing aids (e.g. calcium stearate, stearic acid or polyvinyl acetate), solvents (e.g. water) or plasticisers. The choice of such substances will, as will be appreciated by those skilled in the art, depend upon the nature of the first polymer itself, plasticisers for example usually being used with polyvinyl alcohol. The plasticiser is preferably a polyhydric alcohol, for example glycol, diglycol, triglycol, sorbitol, manitol, a polyethylene glycol, dipropylene glycerol, 1,2-propane diol, 1,3-propane diol, 1,2-butane diol, 1,3-butane diol, 1,4-butane diol, 1,5-pentone diol, 1,5-hexane diol, 1,6-hexane diol, 1,2,6-hexane triol, 1,3,5-hexane triol, neopentyl glycol, trimethylol propane or a fatty acid monoglyceride. Water can also be used as a plasticiser. When a third layer is present consisting of polyvinyl alcohol or a vinyl alcohol copolymer, a plasticiser is also preferably included in the layer. Examples of plasticisers which can be used in the third layer include those which can be used for the first layer.

The second polymer layer is preferably heat sealable, for example to itself. This can enable films of the present invention to be formed into containers using known methods. Preferred polymers for the second layer which are heat sealable include polyvinyl alcohol containing a plasticiser as described hereinbefore for the polymer layer which is resistant to dissolution and/or softening, or a water, soluble acrylic polymer. Heat sealing desirably occurs at a temperature of less than 100° C. It is also desirable that the second polymer layer be stable at temperatures used to produce films of the present invention, for example at temperatures of from 180° to 200° C. When a water soluble acrylic polymer is used, it will in general be applied as a solution of the polymer in a non-aqueous solvent. The solvent used will usually depend upon the particular acrylic polymer concerned, iso-propanol, tetrahydrofuran, toluene and methylethylketone being examples of solvents which can be used to dissolve acrylic polymers. A preferred group of acrylic polymers for use in accordance with the present invention contains units derived from one or more of acrylic esters, acrylic acid, acrylamide methacrylic esters and methacrylic acid. It is generally preferred to avoid the use of aqueous solutions of water soluble acrylic polymers since they would tend to cause dissolution of the water soluble layers of the films.

As will be appreciated, a variety of combinations of polymer layers are envisaged within the scope of the present invention.

In one combination, a discontinuous layer of a water insoluble polymer, for example nitrocellulose, is provided on a layer of polymer resistant to gelling by perborate ions, for example polyvinyl alcohol containing a plasticiser, e.g. sorbitol or manitol. Films of this structure can be used for various purposes, depending upon the temperature at which the polymer layer resistant to gelling is soluble. Cold water solubility is desirable for example for films of the invention which are to be used to package wallpaper paste, agrochemicals, or cold water washing products. Warm or hot water solubility is generally preferred when the films are to be used to package materials which are themselves to be used at elevated temperatures, e.g. washing products.

Alternatively, a two layer film in accordance with the present invention can consist of a layer of cold water soluble polymer in combination with a layer of a polymer having low solubility at ambient temperature but being soluble at elevated temperatures. The cold water soluble polymer is then preferably a polyvinyl alcohol containing a substance which imparts resistance to insolubilization by borate ions, for example a polyol plasticiser, e.g. sorbitol or manitol. The polymer having low solubility at ambient temperature but being soluble at elevated temperatures is also preferably of a polyvinyl alcohol. Although this layer can include a substance which imparts resistance to insolubilization by borate ions, for example as described for the cold water soluble layer, this is usually not required.

Preferred three layer structures for films of the present invention include two layers similar to, or even identical to, those hereinbefore described for films consisting of two layers. The additional polymer layer should, however, provide the films with resistance to insolubilization by borate ions. This can enable the other layers of the films to be composed of polymers which are not necessarily resistant to insolubilization by borate ions. The preferred polymer for the additional polymer layer is of a water soluble acrylic polymer, preferably as hereinbefore described.

A particularly preferred three layer film in accordance with the present invention consists of a core layer of cold water soluble polyvinyl alcohol with an incoherent layer of nitrocellulose on one surface and a coherent layer of an acrylic polymer on its other surface, the core layer preferably not including a polyol plasticiser.

Films of the present invention can be produced by known methods. Layers including polyvinyl alcohol are conveniently produced by extrusion, and where more than one such layer is present, they can conveniently be produced by coextrusion. Layers of other materials, for example nitrocellulose, polyvinylidene chloride or an acrylic polymer, are often conveniently formed from a lacquer using a suitable solvent.

The thickness of the various layers of films of the present invention can be varied according to the nature of the materials forming those layers and the properties desired for the films. Typically the films will be from 10 to 100 microns thick, with the first polymer layer being from 2 to 9 microns thick and the second polymer layer being from 3 to 6 microns thick. The third layer, when present, will usually be from 10 to 100 microns thick and preferably from 20 to 50 microns thick.

Films of the present invention can be used to package a variety of materials, and especially materials which are themselves to be dissolved in water. Films of the present invention will usually be used in such a way that the layer having resistance to dissolution and/or softening on handling with wet hands will provide the surface which is handled. The other surface of the films will then contact the packaged materials. Materials which can be packed using films of the present invention can be solid or liquid, and examples of materials which can with advantage be packaged using films of the invention include wallpaper paste, washing powders and agrochemicals. The present invention therefore in addition provides packages of materials, the packages being made using a film of the present invention. For example, packages of the present invention can be in the form of sachets.

Packages including films of the present invention can be produced using known methods. It is generally preferred to use the heat sealable properties of the films themselves when they are in fact heat sealable. It is, of course, also possible to use an adhesive layer applied to the film where desired.

The following Examples are given by way of illustration only. All parts are by weight unless indicated otherwise.

EXAMPLE 1

Using a high shear mixer, 60 parts of polyvinyl alcohol (degree of hydrolysis 77 percent, viscosity 11 cps—a cold water soluble grade) were mixed with 7.5 parts of dipropyleneglycol, 0.06 parts of calcium stearate and 0.36 parts of silica having a particle size of about 5 microns. The mixture was then extruded through an annular die and blown using a blow up ratio of 2.5:1 to produce a film 30 microns thick.

One surface of the resulting polyvinyl alcohol film was then coated with a nitrocellulose lacquer using a forward gravure method on an RK KOATER (Trade Mark) coating machine, the lacquer being heated to 50° C. and agitated during the coating procedure to dissolve the waxes in the lacquer. Coating was effected using a gravure cylinder having a rectangular array of 150 depressions per 25.4 mm in each direction, the depressions being 380 microns deep, and a pressure of 10 psi. The coated film was heated to dry the lacquer, after which it was wound up. The dried nitrocellulose coating was discontinuous as a result of the Pattern on the gravure roller.

The other surface of the polyvinyl alcohol film was coated with a cold water soluble acrylic coating composition using similar conditions to those used to coat the fill with the nitrocellulose lacquer, but the acrylic coating composition was applied by reverse gravure coating. The acrylic coating composition was a solution of an acrylic acid/acrylamide/methacrylic acid copolymer in a mixture of tetrahydrofuran and iso-propanol (20:80). The dried acrylic coating was continuous.

The resultant film was subjected to various tests, as follows:

(a) dissolution test A square sample of the film 5 cm×5 cm was weighed, as was a 100 gauge mesh (150 micron pore size). The sample of film was stirred for 3 minutes in 300–400 cc of water, and the solution was filtered through the mesh. The mesh was allowed to dry, and it was reweighed. The amount of undissolved film calculated from the increase in weight of the mesh was 10 percent.

(b) perborate resistance test The acrylic coated surface of a square sample of the above film 5 cm×5 cm but without the nitrocellulose coating was covered with a washing powder containing a perborate. The sample was left for four weeks and the dissolution test described above was carried out. The amount of undissolved film was 1.35 percent compared with 5.1 percent for a fill of the polyvinyl alcohol without the acrylic or nitrocellulose coatings.

(c) water drip through test A sample of the film was stretched over a beaker with the nitrocellulose coated surface uppermost and a droplet of water was placed on the surface of the film. The water took two minutes to dissolve through the film, the time taken for water to dissolve through a monolayer of the polyvinyl alcohol being about five seconds. This test indicated that the film of the invention had resistance to softening on handling with wet hands. This was confirmed in practice by the nitrocellulose surface of the film of the invention not feeling sticky after two minutes whereas a mono-layer of the polyvinyl alcohol of the core of this film having softened and felt very sticky after this period.

EXAMPLE 2

A two layer polymeric film was produced by coextruding the polyvinyl alcohol described in Example 1 with a layer of a similar but hot water soluble grade of polyvinyl alcohol having a degree of hydrolysis of 98 percent and a viscosity of 10 cps. The hot water soluble layer was 9 microns thick and the cold water soluble layer was 21 microns thick.

The cold water soluble surface of the film was then coated with the acrylic composition as described in Example 1.

The amount of undissolved film in the dissolution test described in Example 1 was 20 percent. In the water drip through test, the water took fifteen minutes to dissolve through the film from the side consisting of the hot water soluble polyvinyl alcohol. The hot water soluble polyvinyl alcohol layer behaves similarly to the nitrocellulose layer of the film of Example 1 when handled with wet hands.

We claim:

1. A water soluble or water dispersible polymeric film comprising a first discontinuous layer of a polymer resistant to dissolution and/or softening on handling with wet hands and selected from nitrocellulose or polyvinylidene chloride; a second layer made from a heat sealable polymer which is water soluble and resistant to insolubilization in water by perborate ions and selected from a polyvinyl alcohol or an acrylic; and an intermediate layer interposed between said first and second layers, said intermediate layer being a cold water soluble polyvinyl alcohol which is resistant to insolubilization by perborate ions.

2. A water soluble or water dispersible polymeric film comprising a first layer of a polyvinyl alcohol having a degree of hydrolysis of about 90 to 99% resistant to dissolution and/or softening on handling with wet hands; a second layer made from a heat sealable polymer which is water soluble and resistant to insolubilization in water by perborate ions and selected from a polyvinyl alcohol or acrylic; and an intermediate layer interposed between said first and second layers, said intermediate layer being a cold water soluble polyvinyl alcohol having a degree of hydrolysis of about 75 to 80% which is resistant to insolubilization by perborate ions.

3. A film according to claim 1, wherein the said first polymer layer comprises nitrocellulose.

4. A film according to claim 1 wherein the said second layer comprises a water-soluble acrylate.

5. A container comprising a film according to claim 1.

6. A container according to claim 5, in the form of a sachet.

7. A container according to claim 5, wherein the film is heat sealed.

* * * * *